July 27, 1926.
F. S. CARR
1,593,750
FASTENER
Filed Nov. 10, 1924
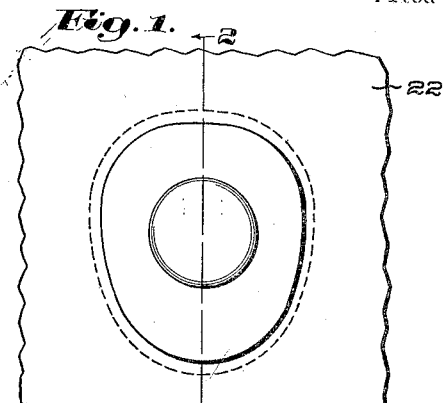
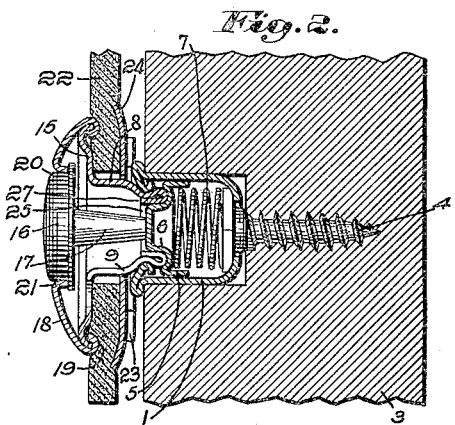
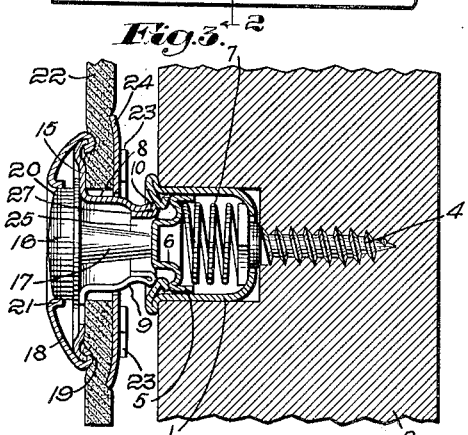
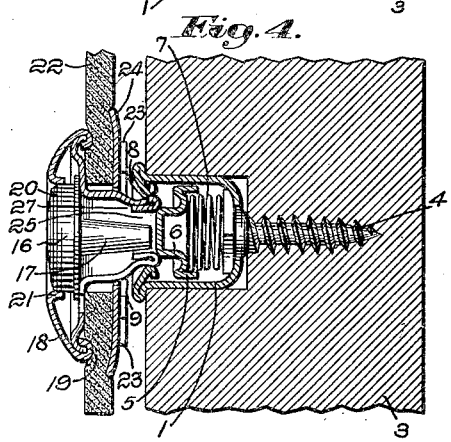
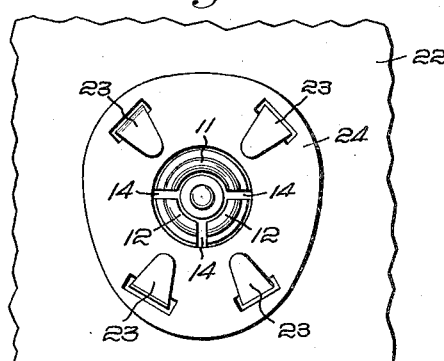
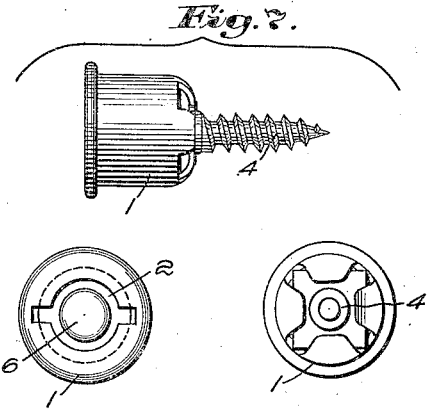
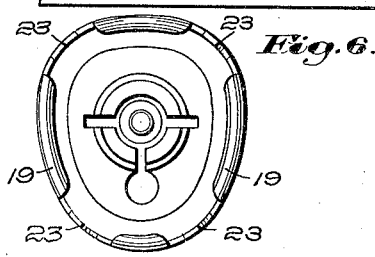
Inventor:
Fred S. Carr,
by Emery Booth Janney & Varney
Attys.

Patented July 27, 1926.

1,593,750

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed November 10, 1924. Serial No. 748,853.

This invention aims to provide an improved separable fastener.

In the drawings, which illustrate a preferred embodiment of my invention:—

Figure 1 is a front elevation of the fastener;

Fig. 2 is a section on the line 2—2 of Fig. 1, being partly in elevation;

Fig. 3 is a section of the parts as shown in Fig. 2, but illustrating the relation of parts as the stud first contacts with the socket;

Fig. 4 is a view similar to Fig. 3, but illustrating the relation of parts as the head of the stud passes into the aperture in the socket;

Fig. 5 is a rear elevation of the stud as applied to the curtain;

Fig. 6 is a rear elevation of the stud before application to a curtain; and

Fig. 7 includes a side, a front and a rear elevation, respectively, of the preferred form of socket.

Referring to the drawings, I have shown a flush type fastener of simple, durable and inexpensive construction, which may be used for securing an automobile curtain or the like to the body of a car or other like support.

The operation of the fastener illustrated is generally like that shown and described in my application Serial No. 719,918, filed June 14, 1924.

In the embodiment of my invention illustrated by the drawings, I have shown a flush type socket including a casing 1 presenting a stud-receiving aperture 2 and secured to the body 3 of an automobile, or like support, by an attaching screw 4. Within the casing, I have provided a combined sealing and locking part 5 presenting a locking extension 6 for cooperation with a stud. The socket and locking part are substantially as shown and described in the copending application of Didrick Dyresen, Serial No. 719,935, filed June 14, 1924. The sealing and locking part 5 is normally urged forward by a spring 7 and the locking extension 6 protrudes into the stud-receiving aperture, as illustrated in Fig. 3.

The stud, as illustrated in Figs. 2, 5 and 6, comprises a contractible and expansible socket-engaging part for engagement with the walls of the aperture 2 in the socket. This socket-engaging part is preferably pressed from a single sheet of metal and presents a shank portion 8, neck 9 and head portion 10 which are formed to present a substantially rigid portion 11 and a plurality of resilient portions 12, 12 herein shown as two in number. These resilient portions are formed by slots 14, which extend into the base 15 of the socket-engaging part to permit contraction and expansion of the resilient portions 12, 12. The reasons for making a portion of the stud head rigid and a portion resilient are substantially those described in my co-pending application Serial No. 708,721, filed April 24, 1924. The combination herein disclosed, however, presents important advantages over the disclosures of my earlier applications herein referred to, as will presently appear.

The stud also includes a press-button member which presents a relatively large button portion 16 and a long tapered portion 17 for cooperation with the locking extension 6, as more fully hereinafter described. The press-button is held in position by a front plate 18 secured to the base 15 of the socket-engaging part by a plurality of ears 19 which extend from the periphery of the front plate 18 over the periphery of the base 15, as illustrated in Figs. 2 and 6. The front plate is preferably convex in cross-section, so as to be spaced away from the base 15, and presents an aperture 20 having a peripheral wall 21 surrounding the button portion 16 of the press-button to provide a guiding surface therefor and to limit the movement thereof toward the front plate.

To secure the stud to the curtain 22, or other flexible carrying medium, I prefer to provide a plurality of attaching prongs 23 which are presented by the front plate 18 and pass through the curtain 22 and slots in a back plate 24, located at the inner face of the curtain, where they are clenched inwardly and downwardly against the face of the back plate 24. Thus the stud is secured to the curtain 22 with the base 15 of the socket-engaging part at the front face of the curtain and the shank, neck and head extending through the curtain and through an aperture in the back plate 24 to present the resilient portions 12, 12 and the rigid portion 11 for engagement with the socket.

The stud is located upon the curtain with the substantially rigid portion 11 toward the body of the curtain for substantially the same reasons as set forth in my above-mentioned copending application.

The stud may be secured to the socket by pressing the stud, with the thumb on the press-button or the fingers on the front plate 18, toward the cooperating socket. The inner end of the socket-engaging part engages the sloping front face of the socket adjacent the aperture 2 (Fig. 3) and further pressure on the stud forces the substantially rigid portion 11, of the socket-engaging part, down the inclined surface of the front face of the socket without noticeable flexing thereof, so as to enter the aperture 2. At the same time, the resilient portions 12, 12 contract and permit passage of the head of the stud into the aperture in the socket, as best illustrated in Fig. 4. As the resilient portions 12, 12 of the stud contract and enter the aperture 2, of the socket, the outer end of the head 10 of the stud engages the locking extension 6, which is excluded from the aperture 25 in the outer end of the stud because of the contraction of the resilient portions 12, 12. The locking extension is then forced against the pressure of the spring 7, out of the aperture 2, to permit passage therethrough of the head 10 of the stud. The extent of entrance of the head of the stud into the socket is limited by the shoulder 26 on the shank portion 8. When the head of the stud is fully engaged in the stud-receiving aperture 2, the sealing and locking member 5 is urged toward its normal position, whereby the locking extension 6 enters the aperture 25 in the head of the stud and engages the reversely bent straight portions 27 surrounding the aperture 25, as best illustrated in Fig. 2.

The locking projection also engages the tapered portion 17 of the press-button and urges the press-button into the position shown in Fig. 2, thus leaving a space between the large portion 16 and the base 15 for operative movement of the press-button. Thus the stud is locked with the socket against accidental separation thereof by strain on the curtain, such as a wind strain or a strain exerted thereupon by a person inside the car. In the combination disclosed in the present application, however, an important advance over that shown in Serial No. 708,721 exists, in that herein the locking member is automatically moved out of the way during entrance of the stud into the socket, whether the entering movement be straight, as when the stud is attached to a loose curtain, or angled with the rigid portion initially entered as when the stud is attached to a shrunken or tight curtain, while in Serial No. 708,721, pressure on the press-button was essential to displace the locking member. Further the combination herein disclosed presents advantages over that shown in my application Serial No. 719,919 in that the rigid portion of the stud head prevents such collapse of the stud head due to strain from a shrunken or otherwise tight curtain as would prevent entrance of the locking part into the aperture at the end of the stud head and hence prevent the locking of the stud within the socket.

Separation of the stud from the socket may be effected by grasping the lower edge of the curtain and exerting a slight outward pull thereon, at the same time pressing the exposed portion 16 of the press-button with the thumb, which moves the press-button relative to the rest of the stud, whereby the tapered portion 17, of the stud, moves the locking extension 6 out of engagement with the reversely bent portions 27, thus permitting contraction of the resilient portions 12, 12, and separation of the head 10 of the stud from the socket by a tipping movement.

While I have shown and described a preferred form of my invention, it will be understood that changes involving omission, substitution, alteration and reversal of parts, and even changes in the mode of operation, may be made without departing from the scope of my invention, which is best defined in the following claims.

Claims:—

1. A separable fastener comprising, in combination, a socket presenting a stud-receiving aperture, a cooperating stud having an aperture at its outer end surrounded by a rigid socket-engaging portion and a resilient socket-engaging portion and locking means in said socket for entrance into the aperture in said stud to engage said resilient portion to lock said stud and socket together.

2. A seperable fastener comprising, in combination, a socket presenting a stud-receiving aperture, a cooperating stud having an aperture at its outer end surrounded by a rigid socket-engaging portion and a plurality of resilient socket-engaging portions and locking means in said socket of substantially the same diameter as the diameter of the aperture in the stud for entrance into the aperture in said stud to engage said resilient portions to lock said stud and socket together.

3. A separable fastener comprising, in combination, a socket presenting a stud-receiving aperture, a cooperating stud presenting a rigid socket-engaging portion and a plurality of resilient socket-engaging portions, locking means in said socket for engagement with said resilient portions to lock said stud and socket together, and a press-button in said stud for moving said locking means out of engagement with said resilient portions to permit separation of said stud and socket.

4. A separable fastener comprising, in combination, a socket presenting a stud-receiving aperture, a cooperating stud presenting a head for engagement within said socket, said head partially rigid and partially resilient and presenting an aperture in its end, and resiliently pressed locking means in the socket of a cross-sectional area equal to the normal cross-sectional area of the aperture in the stud for entrance into said aperture to oppose in one position resilient contraction of the resilient part of said head toward the rigid portion thereof, while permitting such contraction when shifted into another position.

5. A separable fastener comprising, in combination, a socket presenting a stud-receiving aperture, a cooperating stud presenting a head for engagement within the socket, said head partially rigid and partially resilient and presenting an aperture in its end, a spring-pressed locking member in said socket adapted to enter said aperture in the head of the stud interiorly to engage the rigid and the resilient portions of the head, thereby to prevent separation of said stud and socket, and a manually operable press-button in said stud for moving said locking member out of engagement with said rigid and resilient portions to permit separation of said stud and socket.

6. A separable fastener comprising, in combination, a socket presenting a stud-receiving aperture of fixed dimensions, and a spring-pressed locking member normally presented at and closing said aperture, a cooperating stud presenting a socket-engaging head having a relatively rigid portion and a relatively resilient portion for engagement with the wall surrounding said aperture, said resilient portion contractible when entering the aperture in said socket thereby reducing the size of the aperture in said stud and preventing entrance of the locking member into the stud during engagement with the socket, said stud expansibe after entrance into the aperture in said socket and said locking member thereafter automatically entering the aperture in said stud to prevent contraction of said resilient portion until displaced therefrom.

In testimony whereof, I have signed my name to this specification.

FRED S. CARR.